United States Patent
Bense et al.

(10) Patent No.: US 8,356,772 B2
(45) Date of Patent: Jan. 22, 2013

(54) LIGHTWEIGHT STRUCTURE

(75) Inventors: Rolf Bense, Jork (DE); Steffen Biesek, Hamburg (DE); Robert Alexander Goehlich, Hamburg (DE); Karl-Hinrich Herbst, Bremen (DE); Michael Kreimeyer, Stuhr-Moordeich (DE); Christian Kulik, Osterholz-Scharmbeck (DE); Marco Pacchione, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 465 days.

(21) Appl. No.: 12/509,008

(22) Filed: Jul. 24, 2009

(65) Prior Publication Data

US 2010/0038489 A1 Feb. 18, 2010

Related U.S. Application Data (60) Provisional application No. 61/188,763, filed on Aug. 12, 2008.

(51) Int. Cl.
*B64C 1/12* (2006.01)

(52) U.S. Cl. .................. 244/131; 244/119; 244/120

(58) Field of Classification Search .............. 244/117 R, 244/119, 120, 131
See application file for complete search history.

(56) References Cited

U.S. PATENT DOCUMENTS

| | | | |
|---|---|---|---|
| 2,639,788 A * | 5/1953 | Korsberg et al. ................ 52/463 |
| 6,050,474 A | 4/2000 | Aota et al. | |
| 7,850,117 B2 * | 12/2010 | Lohwasser et al. ........... 244/119 |
| 2008/0067289 A1 * | 3/2008 | Meyer ........................... 244/131 |
| 2009/0134275 A1 * | 5/2009 | Hackius et al. ........... 244/117 R |

FOREIGN PATENT DOCUMENTS

| | | |
|---|---|---|
| JP | DE 698 23 746 TS | 10/2004 |
| JP | DE 10 2006046080 | 4/2008 |

* cited by examiner

*Primary Examiner* — Tien Dinh
*Assistant Examiner* — Nicholas McFall
(74) *Attorney, Agent, or Firm* — Jenkins, Wilson, Taylor & Hunt, P.A.

(57) ABSTRACT

A lightweight structure is disclosed, in particular a lightweight structure for an aircraft which is formed from a large number of components which can be joined together by weld joining processes. According to the invention, the lightweight structure has a component thickness which is increased corresponding to the loads in the joint region of the at least one welded joint compared to a thickness of the component outside the joint region.

12 Claims, 7 Drawing Sheets

LIGHTWEIGHT STRUCTURE

CROSS-REFERENCE TO RELATED APPLICATIONS

This application claims the benefit of U.S. Provisional Application No. 61/188,763, filed Aug. 12, 2008, the entire enclosure of which is herein incorporated by reference.

FIELD OF THE INVENTION

The invention relates to a lightweight structure, in particular for an aircraft, which is formed from a large number of components which can be joined together by weld joining processes.

In current production of large-scale structural components, for example fuselage shells for aircraft, skin plates or skin panels of the greatest possible size are used to produce the fuselage structure in order to minimise the number of longitudinal and transverse joints and thus to minimise the structural weight of the aircraft fuselage. The skin plates are joined together by applying stringers and frame segments to form shells and then sections which are finally joined together by a transverse joint to form the fuselage structure, and besides riveting and bonding processes, welding processes, such as in particular friction stir welding (FSW) are used as the joining process to reduce the weight of the structural components at reduced production costs by omitting the attachment elements.

Friction stir welding devices of this type have a friction stir welding head with a welding pin which rotates about its longitudinal axis and has a tool shoulder on one side or on both sides of the work piece. Due to the friction heat generated by the rotation of the welding pin and of the tool shoulder, the material in the weld formation region is plasticised, the rotating welding pin causing the stirring and thus mixing of the material of the components. The tool shoulders allow a unilateral or bilateral smoothing of the weld surface in a single operation. To ensure adequate strength in the joint regions, i.e. in the region of the longitudinal and transverse welds, a thickness of the skin plates which is dimensioned in accordance with the structural loads is necessary, and so structural components of this type have a high structural weight. It is also disadvantageous in manufacturing terms that when a transverse weld meets a longitudinal lap weld, a jump in thickness occurs which cannot be bridged by a friction stir weld.

SUMMARY OF THE INVENTION

In contrast thereto, the object of the invention is to provide a lightweight structure which allows high mechanical strength with a minimum structural weight and minimum production costs.

This object is achieved by a lightweight structure having the features of claim 1.

The lightweight structure according to the invention, in particular a lightweight structure for an aircraft, is formed from a large number of components which can be joined together by weld joining processes. According to the invention, the lightweight structure has in the joint region of the at least one welded joint a component thickness which is increased corresponding to the loads compared to a thickness of the component outside the joint region. The course of the thickness is preferably configured according to the course of the load of the lightweight structure, so that a join is obtained which corresponds to the high demands made on the quality of the join, particularly in aviation. The component thickness which is adapted to the load in the joint region allows a high strength structure which is optimised in terms of weight to be achieved. Consequently, compared to the prior art, large-area lightweight structures are possible in assembly, in particular in so-called "major component assembly" (MCA) and "final assembly line" (FAL).

According to a particularly preferred embodiment of the invention, at least one component in the joint region of the welded joint is provided with a plate thickness which is increased corresponding to the loads compared to a plate thickness of the component outside the joint region.

In a specific embodiment, the welded joint is configured as a butt weld, the components to be joined together having a plate thickness which is increased corresponding to the loads compared to a plate thickness of the component outside the joint region. The plate thickness of the components in the joint region is preferably identical, thus achieving a flush abutment.

As an alternative or in addition, the welded joint can have at least one lap weld.

The components are preferably composed of a plurality of plates of a different thickness to form a load-dependant plate thickness ("tailored blank"). The advantage of this solution is that the components do not have to be machined down to the desired plate thickness in an expensive manner in manufacturing terms in order to achieve a weight-optimised structural component.

In an embodiment according to the invention, the components have a gradual thickness course, the plate thickness being configured dependent on location and as a function of the respective load.

According to the invention, the components more preferably form a skin plate of an aircraft fuselage structure, it being possible to apply profiled parts, such as stringers and/or frames to reinforce the skin plate. In this respect, it is particularly preferred if the region which has an increased plate thickness extends into a joining region of the profiled parts. The frames can be fixed directly to the skin plate by connecting clips or on the basis of the thickness course of the skin plates which is adapted to the load.

In an alternative embodiment, the component thickness of the lightweight structure which is increased in the joint region is achieved by at least one reinforcing plate to form an additional load path. In this respect, it has proved to be particularly advantageous in manufacturing terms if the components to be joined together are arranged in a common plane in the joint region, the reinforcing plate overlapping at least in portions the end portions of the components and being joined thereto by a welded joint. In this case, the skin plates can be arranged at a mutual spacing so that a tolerance-compensating transverse joint concept is achieved.

The at least one reinforcing plate is preferably configured as a sheet metal comb which is set back in the region of the stringer ends and encompasses said stringer ends in portions. The geometry of the sheet metal comb allows a compensation in tolerance for the transverse weld, without in so doing having to change the zero orientation of the stringer ends or having to use connection elements (stringer couplings). The sheet metal combs form a load path and thus allow the stringers to run out upstream of the weld region. It is therefore possible to dispense with a coupling of the stringer ends by connection elements in the section joint. In addition, the stringer ends of individual or of all oppositely arranged stringers can be joined by connection elements. This means that an even further improved component strength and reliability can be achieved.

In a specific embodiment of the invention, the first components form at least an inner sheet metal skin and the second components form an outer sheet metal skin which are joined together to form a section by a longitudinal join configured as a riveted, bonded or welded lap joint. The sections can be joined together preferably by a transverse weld configured as a butt weld, the joint region of the first sheet metal skin being set back such that the second sheet metal skin can be welded substantially up to a terminating edge. The outer skin plates are preferably each provided in the region of the transverse weld with a notch which extends from an outer edge over the terminating edge of the inner skin plate, so that the transverse weld in the region of the inner skin plates can be formed independently of the transverse weld of the outer skin plates.

A friction stir welding device comprising two tool shoulders ("bobbin tool") can be used particularly advantageously in manufacturing terms for joining the fuselage sections, which device produces a substantially smooth surface on both sides of the lightweight structure. The two-shouldered friction welding tool can advantageously be removed after processing via the recess formed by the notches, so that no further openings are required. At least one doubler plate is preferably provided in the region of the notches to cover the recess.

Friction stir welding is particularly preferred according to the invention, as friction stir welds have an almost optimum joining structure in the weld region which is comparable with the original material characteristics of the components which have not yet been joined together. Thus, joining components by friction stir welding makes it possible to produce mechanically tough structures. As an alternative or in addition, it is possible to use laser beam welding processes and/or fusion welding processes.

Other advantageous developments of the invention are disclosed in the further subclaims.

BRIEF DESCRIPTION OF THE DRAWINGS

In the following, preferred embodiments of the invention are described in detail with reference to schematic drawings, in which.

DETAILED DESCRIPTION OF THE DRAWINGS

Figure 1:
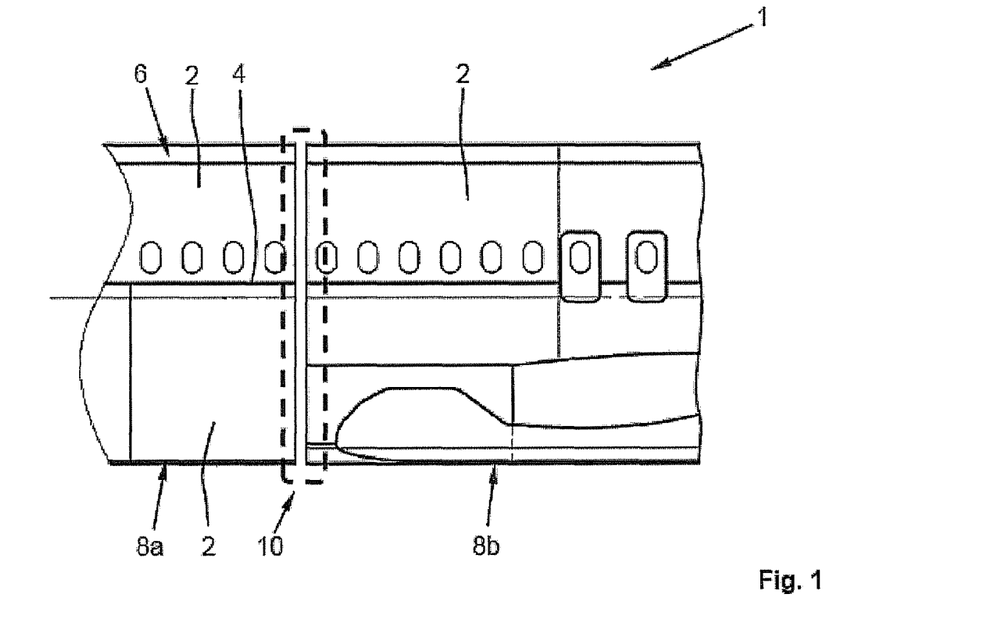
FIG. 1 shows a lightweight structure configured as a fuselage structure for aircraft according to a first embodiment of the invention.

FIG. 1 shows a lightweight structure 1 configured as a fuselage structure for aircraft and consisting of skin plates 2 which are joined together by riveted longitudinal joins 4 to form so-called fuselage shells 6 and these are joined together to form sections 8a, 8b. The sections 8a, 8b are then joined together to form from the fuselage structure 1 of the aircraft by means of transverse joints 10, as indicated schematically in FIG. 1. The construction of a fuselage structure 1 of this type is described in detail in the following with reference to FIGS. 1 to 4.

Figure 2:
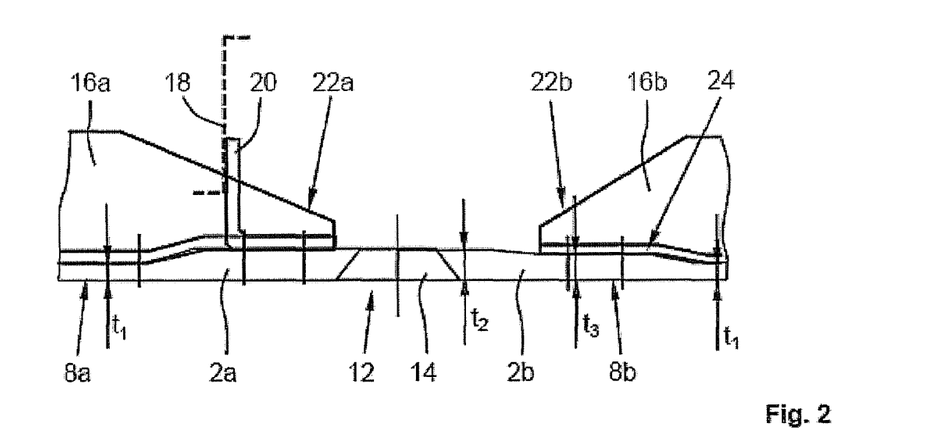
FIG. 2 is a sectional view of the fuselage structure from FIG. 1 in the region of the sections joined edge-to-edge.

FIG. 2 shows a sectional view of the fuselage structure 1 of FIG. 1 in the region of the sections 8a, 8b joined edge-to-edge by a friction stir welding process, a wedge-shaped butt weld (transverse weld) 14 being formed from outside, i.e. in FIG. 2 from below, during the friction stir process in a joint or weld formation region 12 by means of a welding pin and tool shoulders arranged on both sides of the skin plates 2a, 2b. According to the invention, in the joint region 12 of the weld, the lightweight structure 1 has a component thickness which is increased corresponding to the loads compared to a thickness of the construction element outside the joint region. In the illustrated embodiment of the invention, both skin plates 2a, 2b in the joint region 12 of the weld are provided with a plate thickness $t_2$ which is increased corresponding to the loads compared to a plate thickness $t_1$ of the skin plates 2a, 2b outside the joint region. The plate thickness $t_2$ of the skin plates 2a, 2b in the joint region 12 is configured identically, so that a flush abutment is obtained. The course of the thickness is configured to be approximately gradual corresponding to the load level, so that a join is achieved which corresponds to the high demands made on the quality of the join, particularly in aviation. Due to the component thickness adapted to the load in the joint region 12, a high strength structure is provided which is optimised in terms of weight.

Profiled parts, such as stringers 16a, 16b and frames 18 are provided to reinforce the skin plates 2a, 2b. The fuselage frames 18 which are indicated schematically and extend transversely to the longitudinal axis of the aircraft are fixed to the skin panel by connecting clips 20, the region of an increased plate thickness $t_2$ extending up into a joining region of the profiled parts 16a, 20. Due to the introduction of force into the fuselage frame 18, the connecting clip 20 is arranged in the region 12 of a large plate thickness $t_2$, the stringer ends 22a extending and stopping just before the weld 14. The plate thickness $t_2$ is reduced to the lower plate thickness $t_1$ on the stringer side downstream of the stringer end 22 and the connection region of the connecting clip 20. On the adjacent skin plate 2b, as a result of the load which is reduced without frame connection, the stringers 16b terminate in a transition region 24 of an intermediate thickness $t_3$ which decreases in a gradual manner towards a connection region of the stringers 16b again with reduced plate thickness $t_1$. The stringer ends 22a, 22b are configured to be bent at right angles according to the course of the plate thickness and rest in a substantially planar manner against the skin plates 2a, 2b. To form the load-dependent plate thickness, the skin plates 2a, 2b are preferably composed of a plurality of plates of different thicknesses, for example by a welding process ("tailored blank"), so that the skin plates 2a, 2b do not have to be machined down to the desired thickness in a costly manner in order to achieve a weight-optimised structural component 1.

Figure 3:
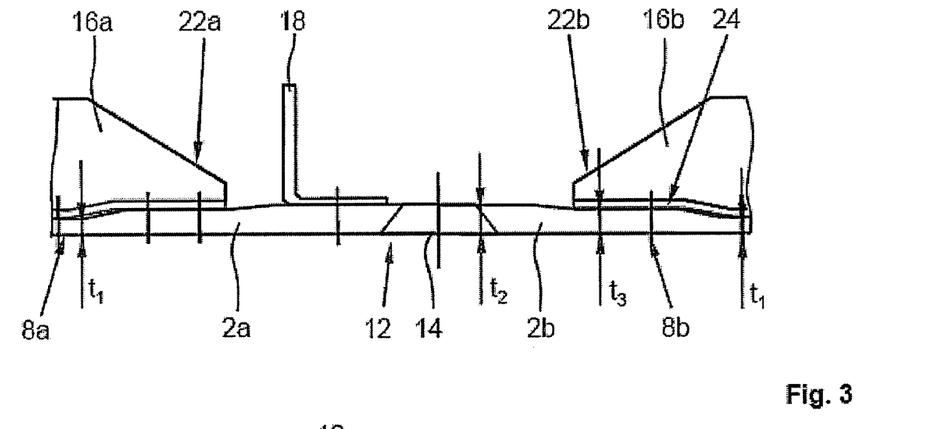
FIG. 3 is a sectional view of components joined along their longitudinal edges by friction stir welding according to an alternative embodiment of the invention.

According to FIG. 3 which shows a sectional view of skin plates 2a, 2b joined by friction stir welding according to an alternative embodiment of the invention, the fuselage frames 18 in this embodiment are attached directly, i.e. without connecting clips, to the skin panel on the basis of the thickness path of the components which is adapted to the load. In the illustrated embodiment, the frame 18 is joined to the skin plate 2a in the region of a large plate thickness $t_2$ by a rivet joint. On both skin plates 2a, 2b, due to the load which is reduced without a frame connection, the stringers 16a, 16b terminate in a transition region 24 of an intermediate thickness $t_3$ which decreases gradually in each case towards a connection region of the stringers 16a, 16b again with a reduced plate thickness $t_1$.

In the following, the formation of the transverse weld 14 in the region of a longitudinal join 4 is described by way of example with reference to FIG. 4 which shows the fuselage structure 1 from FIG. 1 in the region of the transverse weld 14 and a longitudinal join 4 joining the skin plates 2a-2d.

Figure 4:
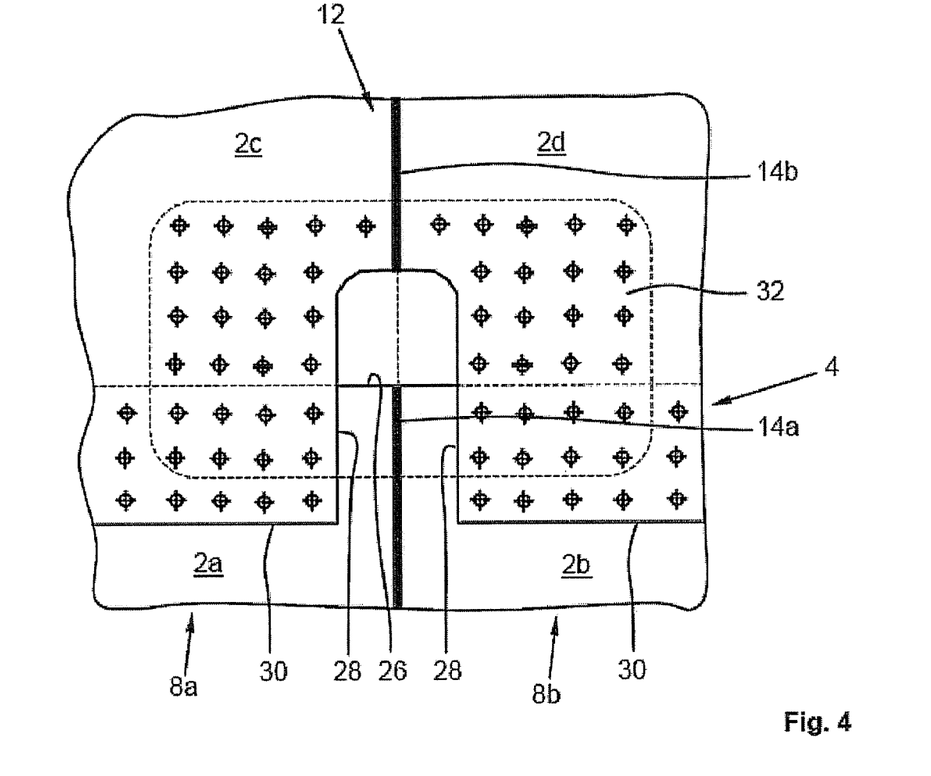
FIG. 4 is a plan view of the fuselage structure from FIG. 1 in the region of the transverse weld and the longitudinal joins joining the skin plates.

As can be inferred from FIG. 4, the skin plates 2a, 2b form an inner sheet metal skin and the skin plates 2c and 2d form an outer sheet metal skin, the skin plates 2a, 2c; 2b, 2d having been joined together in the illustrated embodiment to form sections 8a, 8b by the longitudinal join 4 configured as a riveted lap joint. Sections 8a, 8b are joined by the transverse weld configured as a butt weld 14a, 14b, the joint region 12 of the skin plates 2c, 2d being set back such that the skin plates 2a, 2b can be welded up to a terminating edge 26. For this purpose, the outer skin plates 2c, 2d are each provided in the region of the transverse weld 14a, 14b with a notch 28 which extends from an outer edge 30 over the terminating edge 26 of the inner skin plates 2a, 2b, so that the transverse weld 14a can be formed in the region of the inner skin plates 2a, 2b independently of the transverse weld 14b of the outer skin plates 2c, 2d. A friction stir welding device with two tool shoulders can be used particularly advantageously in manufacturing terms for joining the fuselage sections 8a, 8b, which device produces a substantially smooth surface on both sides of the lightweight structure 1. The two-shouldered friction welding tool can advantageously be removed after processing via the recess formed by the notches 28, so that no further openings are required. An approximately rectangular doubler plate 32 is then attached to the structure by a rivet joint in the region of the notches 28 from an inside for covering the recess and for reinforcing the structure.

Figure 5:
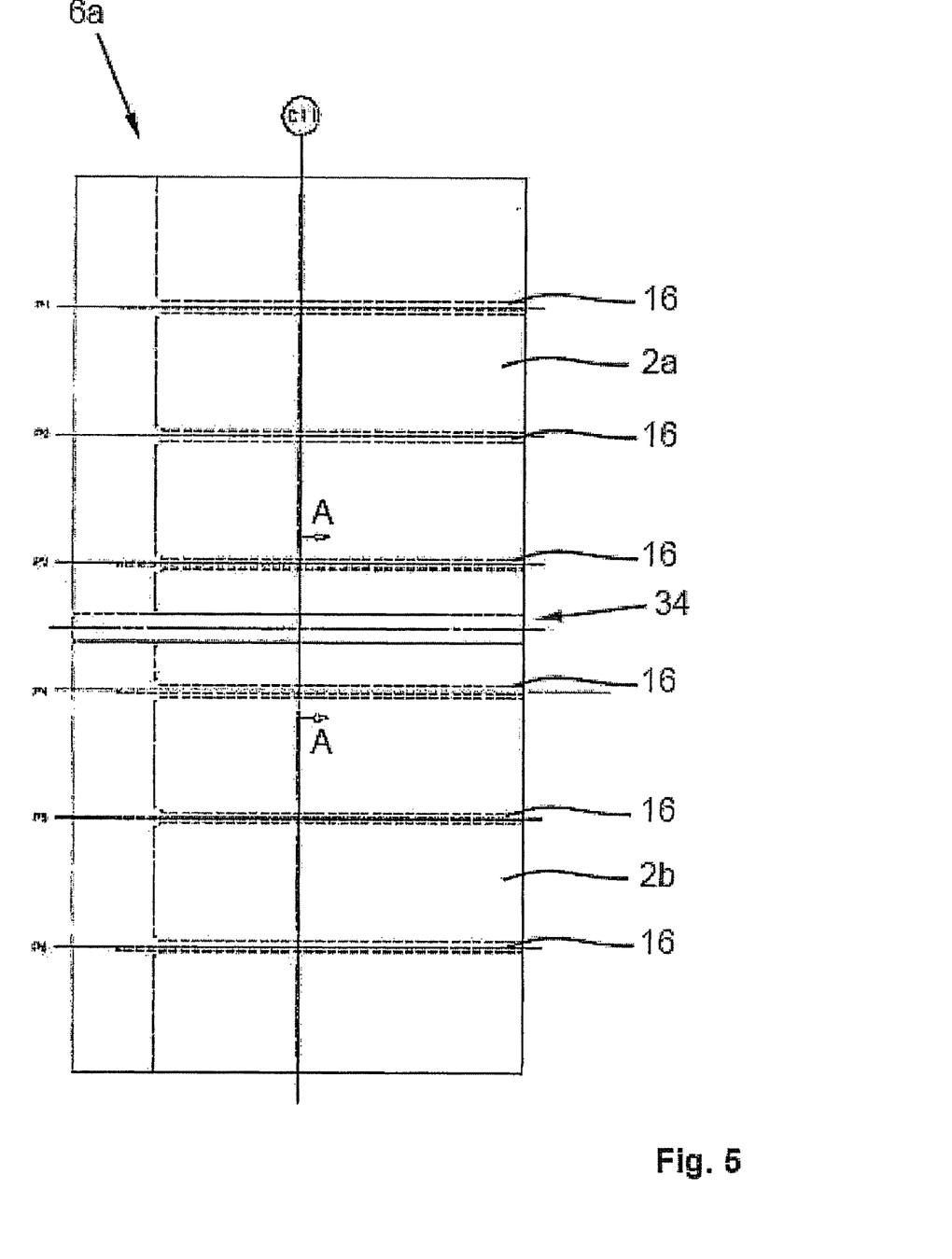
FIG. 5 is a plan view of a fuselage shell consisting of two components joined along their longitudinal edges by a friction stir welding process, according to a further embodiment of the invention.

FIG. 5 shows a plan view of a fuselage shell 6a consisting of two components which are configured as skin plates 2a, 2b of a fuselage structure 1 of an aircraft and are joined along their longitudinal edges by a friction stir welding process according to a further embodiment of the invention. A plurality of stringers 16 which are arranged in parallel and extend in the direction of the longitudinal axis of the aircraft is provided to reinforce the fuselage shell 6a.

Figure 6:
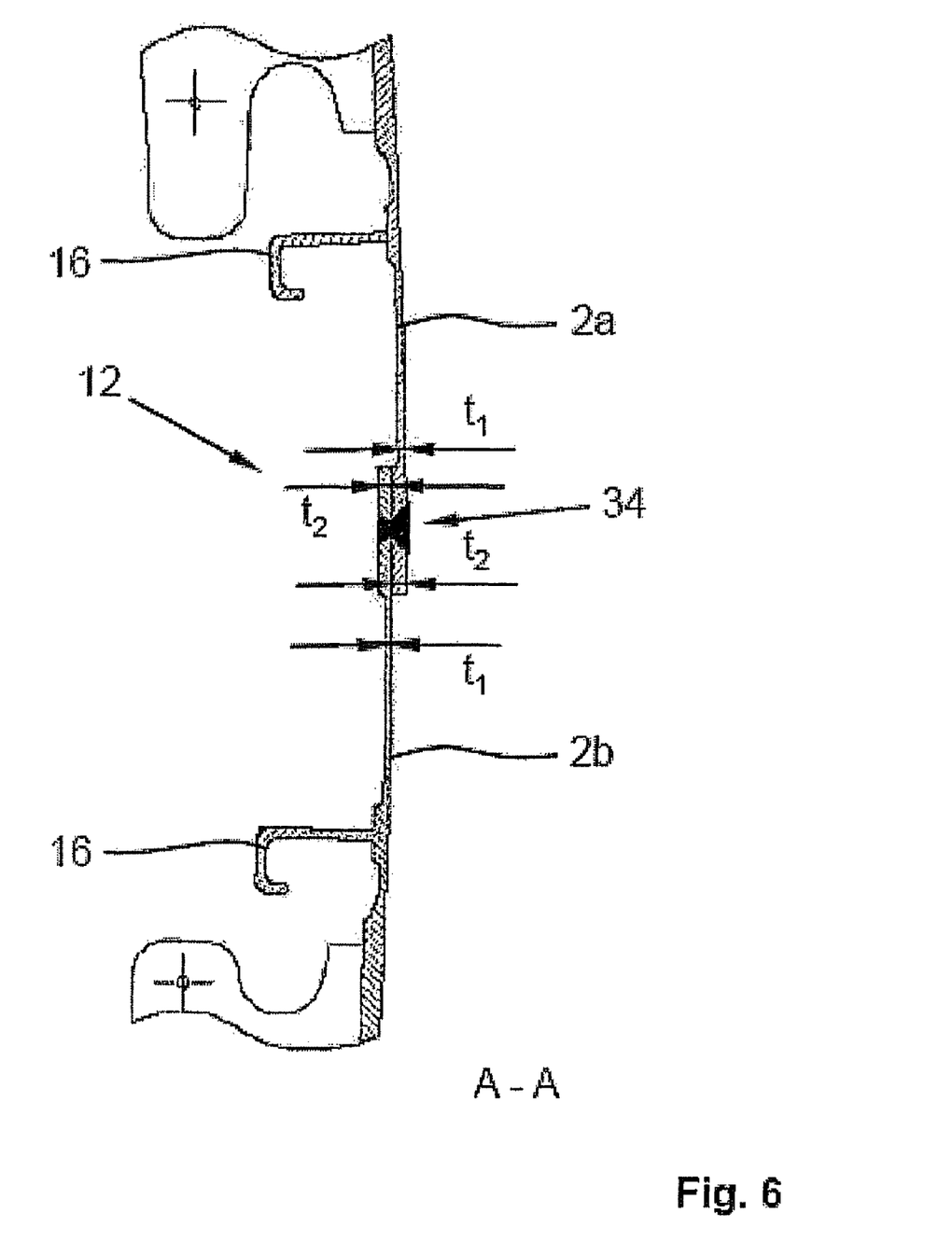
FIG. 6 is a sectional view along line A-A from FIG. 5.

As can be seen in particular from FIG. 6 which shows a sectional view along line A-A of FIG. 5, the longitudinal join is configured in this embodiment as a lap weld 34, at least one skin plate 2a, 2b which is to be joined having a plate thickness which is increased corresponding to the loads compared to a plate thickness of the skin plate outside the joint region 12. In the illustrated embodiment, the two skin plates 2a, 2b are each provided in the joint region 12 with a thickened portion which has a plate thickness $t_2$. Downstream of the joint region 12, the plate thickness $t_2$ decreases in an approximately gradual manner to a minimum thickness $t_1$ and then increases, as a function of the load, over a plurality of intermediate regions of an increasing plate thickness. The plate thickness is also increased in the region of the stringer connection to improve the introduction of force.

Figure 7:
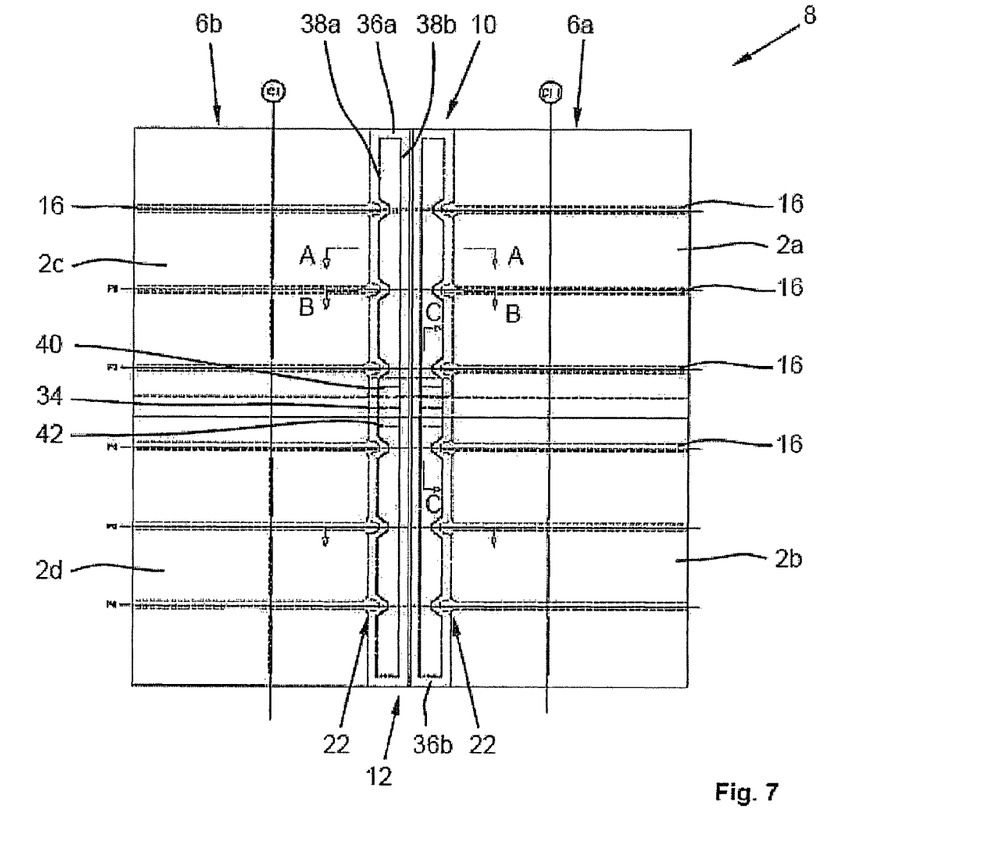
FIG. 7 is a plan view of the fuselage shell from FIG. 5 which is joined to a further fuselage shell to form a fuselage section.

FIG. 7 shows a plan view of the fuselage shell 6a from FIG. 5 which is joined to a further fuselage shell 6b, having skin plates 2c, 2d, to form a fuselage section 8. In the joint region 12 of the transverse joint 10, the lightweight structure has a component thickness which is increased corresponding to the loads compared to a thickness of the component outside the joint region. In the illustrated embodiment of the invention, the component thickness of the lightweight structure which is increased in the joint region is achieved by a reinforcing plate arrangement which has an upper reinforcing plate 36a in FIG. 7 and a lower reinforcing plate 36b to form a load path. The reinforcing plates 36a, 36b are configured as sheet metal combs which are set back in the region of the stringer ends 22, encompass at a distance the stringer ends 22 and overlap in the region of the longitudinal join (see FIG. 8c), the sheet metal combs 36a, 36b each being joined to the skin plates 2a-2d by two welds 38a, 38b which extend parallel in portions and are associated with each skin plate 2a to 2d. The weld 38a on the stringer side is configured to be set back in each case corresponding to the outer contour of the sheet metal combs 36a, 36b in the region of the stringer ends 22. In addition to the sheet metal combs 36a, 36b, the stringer ends 22 of individual or of all mutually opposite stringers 16 can be joined by connection elements (coupling elements). This provides an even further improved component strength and reliability.

Figure 8A:
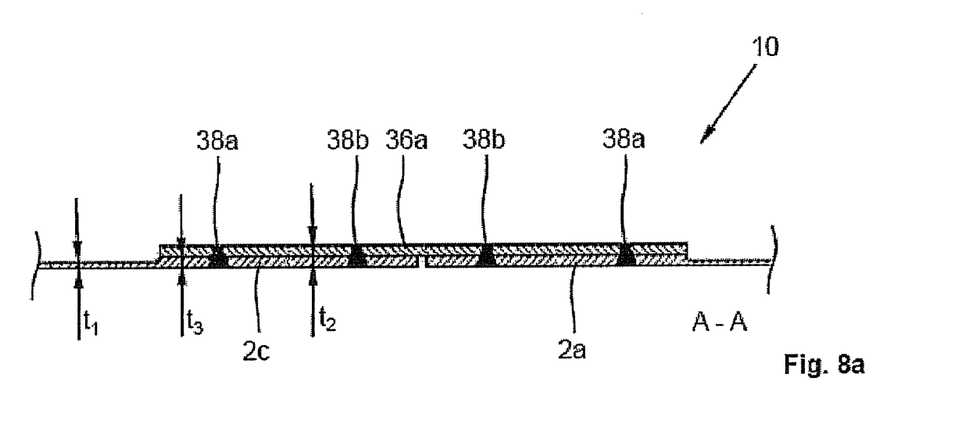
FIG. 8a is a sectional view along line A-A from FIG. 7.
Figure 8B:
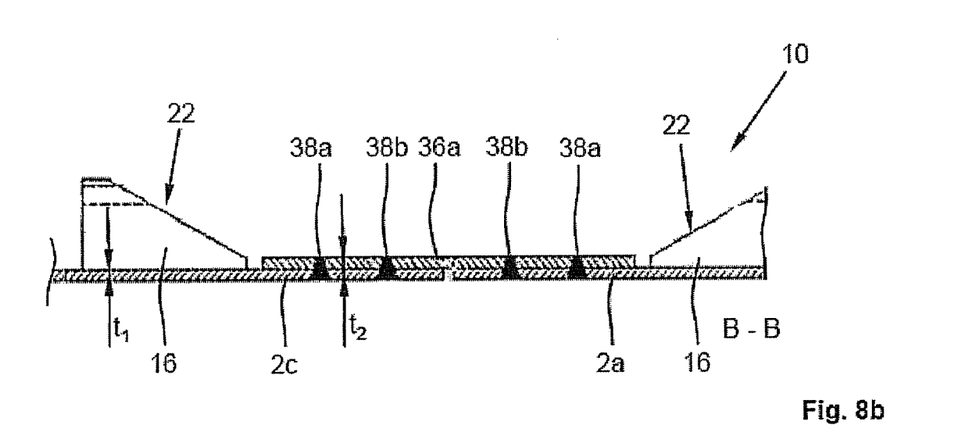
FIG. 8b is a sectional view along line B-B from FIG. 7.

As can be seen from FIGS. 8a and 8b which are sectional views along line A-A and B-B respectively from FIG. 7, it has proved to be particularly advantageous in manufacturing terms if the skin plates 2a, 2c which are to be joined are arranged in a common plane in the joint region 12, the sheet metal comb 36a overlapping the end portions of the skin plates 2a, 2c in portions on the inside and being joined thereto by means of the weld 38. Thus, in the joint region of the transverse joint 10, the lightweight structure has a component thickness $t_2$ which is increased corresponding to the loads compared to a thickness $t_1$ of the construction element outside the joint region. Furthermore, the thickness of the skin plates 2a, 2c in the joining region without a stringer connection is increased in each case to a plate thickness $t_3$ compared to the plate thickness $t_1$ (cf. FIG. 8a). The skin plates 2b, 2d are joined accordingly by means of the sheet metal comb 36b, so that it is possible to forego a description in this respect.

Figure 8C:
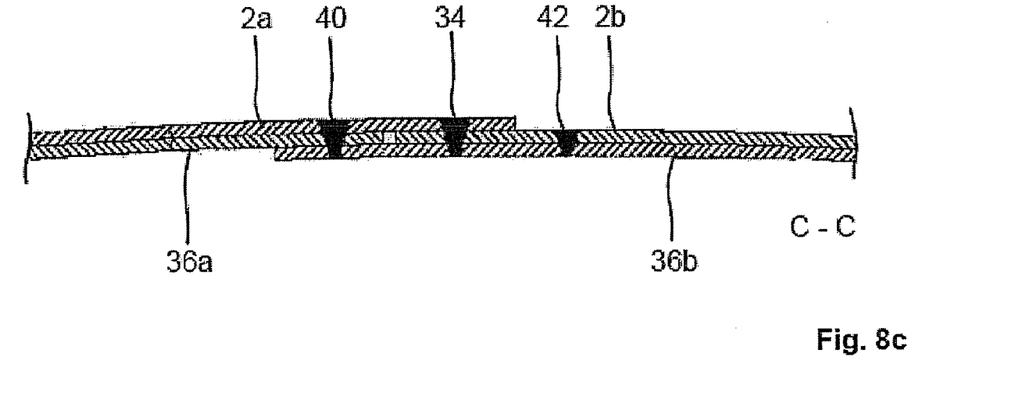
FIG. 8c is a sectional view along line C-C from FIG. 7.

According to FIG. 8c which shows a sectional view along line C-C of FIG. 7, a hole-free fuselage shell is achieved by means of a doubler cover plate consisting of the sheet metal combs 36, 36b. For this purpose, the sheet metal comb 36a extends in the joint region in a common plane with the skin plate 2b, an end portion of sheet metal comb 36a being overlapped by the sheet metal comb 36b and being joined thereto and to the skin plate 2a by a longitudinal weld 40, thereby forming a closed structure. Furthermore, the sheet metal comb 36b is joined to the skin plate 2b by a longitudinal weld 42.

The lightweight structure according to the invention is not restricted to the friction stir welding process described, in fact different weld joining processes known from the general prior art can be used, such as laser beam welding or fusion welding. However, friction stir welding is particularly preferred according to the invention, as friction stir welds have in the weld region an almost optimum joining structure and thus have a high static and dynamic strength.

A lightweight structure 1 is disclosed, in particular a lightweight structure for an aircraft, which is formed from a large number of components 2 which can be joined together by weld joining processes. According to the invention, the lightweight structure 1 has a component thickness $t_2$ which is increased corresponding to the loads in the joint region 12 of the at least one welded joint compared to a thickness $t_1$ of the component outside the joint region 12.

The invention claimed is:
1. A lightweight structure for an aircraft, comprising:
a plurality of components joined together by a weld joining process to form a welded joint region, wherein a thickness of a plurality of components corresponds to loads in the welded joint region, and the thickness of the plurality of components is greater at the welded joint region compared to a thickness of the plurality of components outside the welded joint region, wherein the component thickness follows a continuous, load-dependent thickness path decreasing from the greater thickness to a lesser thickness in a continuous manner, wherein the plurality of components are a plurality of skin plates reinforced with a plurality of stringers, at least one reinforcing plate associated with the welded joint region, and wherein the at least one reinforcing plate is a sheet metal comb being set back in a region of stringer ends.

2. The lightweight structure according to claim 1, wherein the welded joint region comprises at least one butt weld.

3. The lightweight structure according to claim 1, wherein the welded joint region comprises at least one lap weld.

4. The lightweight structure according to claim 1, wherein at least one component is composed of a plurality of individual plates to form a load-dependent plate thickness of tailored blank.

5. The lightweight structure according to claim 1, wherein the components form a fuselage shell of an aircraft, and wherein the fuselage shell is reinforced with at least one of a plurality of stringers, and a plurality of frames.

6. The lightweight structure according to claim 1, wherein a region of an increased component thickness extends up into a joining region of a plurality of profiled parts.

7. The lightweight structure according to claim 5, wherein at least one of the plurality of frames is attached in the welded joint region.

8. The lightweight structure according to claim 1, wherein the components to be joined are arranged in the joint region in a common plane, the at least one reinforcing plate overlapping at least in portions the peripheral regions of the components and being joined thereto by a welded joint.

9. The lightweight structure according to claim 1, wherein the stringer ends of oppositely arranged stringers are joined by connection elements.

10. The lightweight structure according to claim 1, wherein the components form at least an inner sheet metal skin and an outer sheet metal skin which are joined together by a longitudinal join configured as a lap joint to form a plurality of sections, wherein the plurality of sections are joined by a transverse weld and a joint region of the inner sheet metal skin being set back so the outer sheet metal skin is welded up to a terminating edge.

11. The lightweight structure according to claim 1, wherein the weld joining process comprises at least one of a friction stir welding process, a laser beam welding process, and a fusion welding process.

12. The lightweight structure according to claim 1, wherein a two-shouldered friction stir welding device is used for the weld joining process, and wherein the two-shouldered friction stir welding device is capable of being removed after processing via a recess, and wherein the recess is covered with a doubler plate thereof.

* * * * *